US011708292B1

(12) United States Patent
Alvarez

(10) Patent No.: US 11,708,292 B1
(45) Date of Patent: Jul. 25, 2023

(54) GLASS/QUARTZ COMPOSITE SURFACE

(71) Applicant: Stone Composite Surfaces, Inc., Buena Park, CA (US)

(72) Inventor: Alexander Luis Alvarez, Laguna Niguel, CA (US)

(73) Assignee: Stone Composite Surfaces, Inc., Laguna Niguel, CA (US)

( * ) Notice: Subject to any disclaimer, the term of this patent is extended or adjusted under 35 U.S.C. 154(b) by 646 days.

(21) Appl. No.: 16/738,181

(22) Filed: Jan. 9, 2020

Related U.S. Application Data

(63) Continuation-in-part of application No. 16/401,377, filed on May 2, 2019.

(60) Provisional application No. 62/807,381, filed on Feb. 19, 2019, provisional application No. 62/736,915, filed on Sep. 26, 2018, provisional application No. 62/692,215, filed on Jun. 29, 2018.

(51) Int. Cl.
  *C03C 3/06* (2006.01)
  *C03C 1/00* (2006.01)
  *C03B 19/09* (2006.01)

(52) U.S. Cl.
  CPC .............. *C03C 1/006* (2013.01); *C03B 19/09* (2013.01); *C03C 3/06* (2013.01); *C03C 2203/30* (2013.01)

(58) Field of Classification Search
  CPC .............................. C03C 3/06; C03C 2203/30
  USPC ........................................................ 264/115
  See application file for complete search history.

(56) References Cited

U.S. PATENT DOCUMENTS

| | | | |
|---|---|---|---|
| 3,278,662 | A | 10/1966 | Mangrum |
| 7,815,827 | B2 | 10/2010 | Cruz |
| 8,653,156 | B2 | 2/2014 | Ong et al. |
| 9,090,509 | B2 | 7/2015 | Ramon Moreno et al. |
| 10,245,763 | B2 | 4/2019 | Benito Lopez et al. |
| 10,329,188 | B2 | 6/2019 | Benito Lopez |
| 2002/0043578 | A1 | 4/2002 | Ottergren |
| 2002/0137619 | A1 | 9/2002 | Geier et al. |
| 2005/0028556 | A1 | 2/2005 | Akai et al. |
| 2006/0138265 | A1 | 6/2006 | Strauss et al. |

(Continued)

FOREIGN PATENT DOCUMENTS

CN  103613325  3/2014

OTHER PUBLICATIONS

Patent Cooperation Treaty, International Search Report and Written Opinion for Application No. PCT/US19/31372, dated Jul. 12, 2019, 9 pages.

*Primary Examiner* — Jeffrey M Wollschlager
*Assistant Examiner* — Xue H Liu
(74) *Attorney, Agent, or Firm* — Stetina Brunda Garred and Brucker

(57) ABSTRACT

A glass/quartz composite structure comprises quartz grit, quartz powder and glass grit wherein the glass grit is in an amount greater than any other single material by weight of the composite structure (e.g. a combined weight of the quartz grit, quartz powder, glass grit, resin, and coupling agent). Natural stone components, which may include the quartz grit and quartz powder, may be in an amount greater than 30% by weight of the composite structure. The structure may be formed into a 1.2-1.5 cm thick slab for countertops using standard cabinet perimeter support. The slab may be made by mixing the quartz grit, quartz powder, glass grit, and binding resin, pouring the mixture in a mold, and compacting the mixture in the mold. Specific natural mineral components, decorative chips, and/or wet mixture pieces (Continued)

may be added to the composite structure to provide aesthetics of specific natural stones.

8 Claims, 2 Drawing Sheets

(56) References Cited

U.S. PATENT DOCUMENTS

| | | |
|---|---|---|
| 2006/0270758 A1 | 11/2006 | Ong et al. |
| 2011/0111141 A1 | 5/2011 | Jeong et al. |
| 2012/0115983 A1 | 5/2012 | Ramon Moreno et al. |
| 2018/0194164 A1 | 7/2018 | Benito Lopez et al. |
| 2020/0181033 A1 | 6/2020 | Interwies |

GLASS/QUARTZ COMPOSITE SURFACE

CROSS-REFERENCE TO RELATED APPLICATIONS

This application is a continuation-in-part of U.S. patent application Ser. No. 16/401,377, filed May 2, 2019 and entitled GLASS/QUARTZ COMPOSITE SURFACE, which relates to and claims the benefit of U.S. Provisional Application No. 62/807,381, filed Feb. 19, 2019 and entitled GLASS/QUARTZ COMPOSITE SURFACE, U.S. Provisional Application No. 62/736,915, filed Sep. 26, 2018 and entitled QUARTZ BLEND COUNTERTOP, and U.S. Provisional Application No. 62/692,215, filed Jun. 29, 2018 and entitled HIGH COMPACT QUARTZ BLEND COUNTERTOP, the entire disclosures of all of which are hereby wholly incorporated by reference.

STATEMENT RE: FEDERALLY SPONSORED RESEARCH/DEVELOPMENT

Not Applicable

BACKGROUND

1. Technical Field

The present disclosure relates generally to a method of forming structures from glass and quartz and, more specifically, to a method wherein glass is a major component that is mixed with quartz, resin (binder) and a coupling agent to form a structure that is stronger and more translucent than conventional quartz surfacing and that can be used in a thinner format for countertops using standard cabinet perimeter support. The thin format and translucency provide for backlighting capabilities and through-body veins. The quartz and glass aggregate structure and resin binder enable the addition of specific mineral components to obtain desired aesthetics and properties. The additives may include aluminum trihydrate for enhancing the whiteness and translucency of pure white marble and feldspar for earth-tone aesthetics.

Specific natural mineral components may be added to the glass/quartz/resin composite structure to provide the aesthetics of specific natural stones. The glass/quartz/resin composite structure may also be crushed into large decorative chips (1.0-2.0 cm) to provide the look of the natural calcite crystals in metamorphic marble. In the morphism of sedimentary rock into metamorphic rock (marble, Dolomite quartzites, etc.), the calcite in limestone will recrystallize forming a mass of interlocking calcite crystals and more complex silicate structures may be formed. The large chips produced from majority crushed glass and quartz may be customized with minerals and pigments to produce decorative chips that provide the aesthetics of specific natural stones.

2. Description of the Related Art

Engineered stone may refer to a composite material comprised of crushed stone which may be bound together by an adhesive (binding resin). An example of an engineered stone may include quartz and feldspar, the two most prevalent minerals in the earth's crust. Engineered stone is commonly used in the construction industry, with quartz in particular finding particular appeal for use as kitchen and bath countertops.

Quartz has desirable structural, performance, and maintenance attributes that make it desirable for use in construction applications in place of natural stone, being stronger, harder, and more stain resistant than granite and marble. However, quartz surfacing lacks the strength required for use as thin format slabs (1.2-1.5 cm) for countertops without full underlayment support and lacks the translucency of onyx, quartzite aesthetics and the white background of pure white marbles. In the U.S., more than 70% of the quartz countertops used are in 3 cm thickness and the remainder in 2 cm thickness. There is a need for a thinner format for countertop applications that will consume less raw materials, reduce handling burden, resulting in reduced handling costs and health & safety benefits for workers doing the handling and installation, and provide the necessary structural strength for use as countertops. Moreover, quartz raw materials needed for premium natural white marbles and quartzites may need to be secured in various foreign countries, resulting in volatility in the overall cost of producing quartz products locally.

In view of the market demand for quartz, there is a need for a thinner slab format for countertops which can be lighter and more economical and also a demand for aesthetics that resemble premium white marbles and quartzite designs. Various aspects of the present disclosure address these needs, as will be discussed in more detail below.

BRIEF SUMMARY

The present disclosure contemplates various apparatuses for overcoming the above drawbacks accompanying the related art. One aspect of the embodiments of the present disclosure is a glass/quartz composite structure comprising of glass grit, quartz powder, a custom binding resin and additional minerals that provide specific desired aesthetics of premium natural stones.

The glass/quartz composite structure may further comprise a silane coupling agent. The silane coupling agent may be in an amount of 1.0-2 percent by weight of the composite structure. The binding resin may be in an amount of 10-14 percent by weight of the composite structure.

The glass grit which may be in an amount 35%-52% of the total composite structure by weight may comprise of conical-shaped or cube-shaped glass grit. The glass grit may be in an amount greater than any other single material by weight of the composite structure. The glass grit may be within the range of 100 microns to 1200 microns and may be sized to pass through a sieve ranging from 16 mesh to 120 mesh. The shape of the glass grit and surface porosity allow for efficient bonding of the resin and the glass grit. The efficiency of the bond is also enhanced by the 1.0%-2.0% silane coupling agent in the resin. The glass grit will remain a larger component of the aggregate as compared to quartz powder and quartz grit.

At least 98% of the quartz powder may be sized to pass through a 325-mesh sieve (45 microns). Quartz powder accounts for 30-35% of the aggregate ingredients by weight. The migration of the quartz powder with the resin into the glass grit improves the density of the aggregate.

The quartz grit may be sized to pass through a sieve ranging from 70 mesh to 120 mesh or from 8 mesh to 16 mesh as needed to achieve desired aesthetics and maintain <40% of the aggregate content in combination with quartz powder and a lower content by weight than glass grit of the total composite structure.

The glass grit may comprise soda-lime-silica and may be produced from various types of glass including window pane plate glass trim, stemware and crystal glass, and glass used for bottles. Glass typically has a tensile strength of 1,000 psi. But theoretically it can have a tensile strength up to 2,500,000 psi due to glass's strong chemical bonds. Factors such as imperfections in the glass such as scratches or fissures may impact the strength of the composite structure and will be discussed in more detail below.

The binding resin may comprise of an unsaturated polyester resin. The binding resin may contain 28-34% styrene, 1.0-1.5% catalyst, 1.0-2.0% silane coupling agent, 0.008-0.01% cobalt accelerator; have a viscosity of 600-850 cPs at 25° C. (after silane addition) and a gel time of 4-8 minutes. The higher viscosity and shorter gel time with the binding resin used with the glass and quartz powder aggregate may provide better adhesion between the resin and the glass surface while providing good migration of the resin and powder within the glass aggregate structure. The typical unsaturated polyester resin used with quartz surfacing contains 37% styrene, has a viscosity of 350-400 cPs and a gel time of 8-12 minutes. The gel time may be defined as the time for when the polymer first starts to turn into a solid immersed in a water bath at 85 degrees C.

The quartz and glass aggregate structure and custom resin binder provide the structure that is stronger and more translucent than conventional quartz surfacing and can be used in a thinner format for countertops and walls. The quartz, glass and resin binder structure also enable the addition of specific natural mineral components when needed to provide specific aesthetics of natural stones and have the majority ingredients in the aggregate be natural minerals. Feldspar grit (10%-20% by weight) may be added to the aggregate sized to pass through sieves ranging from 8 mesh to 120 mesh for earth-tone aesthetics of limestones and concretes. Aluminum trihydrate ("alumina", 2-6% by weight) may be added to the quartz-glass aggregate in a fine powder (sized to pass through sieves ranging from 400 mesh to 800 mesh) for the aesthetics of pure white marbles. Decorative majority glass chips may be added to simulate calcite and dolomite crystals in limestones and marbles. The glass/quartz composite surface with additional natural mineral ingredients provide the aesthetics and feel of natural stones and will fit the definition of agglomerated stone. When added for aesthetic benefit, the combination of alumina or feldspar with quartz powder and quartz grit will provide a majority content of natural mineral ingredients by weight of the total engineered composite structure. However, the quartz grit and powder content in the aggregate will remain lower by weight than glass grit content in the aggregate for the flex and impact strength required for use in thin format slabs.

Another aspect of the embodiments of the present disclosure is a method of manufacturing a glass/quartz composite slab with mineral ingredients for the aesthetic of natural stones and the strength to use in thin format slabs. The method includes mixing glass grit, quartz powder, and a binding resin, and pouring the mixture in a mold. The compaction of the mixture in the mold using a high viscosity resin with 1.0-2.0% silane coupling agent requires sufficient time during the compaction process for the resin and quartz powder to migrate through the aggregate structure. The compaction process time is 250-320 seconds with the present disclosure using an unsaturated polyester resin with 1.0-2.0% silane coupling agent, 10-14 resin percent by weight of the composite structure and a resin viscosity of 600-850 cPs at 25° C. The vibration during compaction allows for the resin/filler paste to migrate throughout the structure. Another aspect of the present disclosure is using a vibration compaction process time of preferably 250-320 seconds for the 600-850 cPs resin and filler quartz to migrate fully through the glass aggregate structure. The resin migration can be further improved by a multi-stage vibration compaction process which increases the compaction power gradually to provide more time for the resin migration in the early stages. A typical compaction process time with Breton equipment is much shorter, approximately 70 seconds, which provides limited time for a gradual compaction power increase.

The method may further comprise heating the compacted mixture in an oven. The oven heating drives the reaction of the resin to bind the aggregate and form a slab which will be polished into a finished product which can be used in a 1.2 cm-1.5 cm thin format for countertops and walls. Another aspect of the present disclosure is the time the slabs are kept in the oven. The process for producing thin format slabs may require reducing stresses in the oven after the reaction of the resin to bind the aggregate and form the slab as well as provide a controlled slab cool down. The slabs are kept in the oven for 90 minutes to 150 minutes instead of 50 minutes typical for a Breton process with quartz surfacing to release internal stresses from the polymer reaction. The polymerization reaction is generally 95% complete after 25 minutes in the oven but the remaining time is used to cure the slabs and reduce stresses from the reaction so as to minimize bending of the slabs during cooling and storage and before polishing. The slabs are stored flat on a metal rack for 24 hours after removal from the oven to keep the slabs flat during cooling before polishing.

The mixing may include preparing a dry mix of the quartz grit and the glass grit, mixing the binding resin with the dry mix to produce a wet mix, and mixing the quartz powder (and possibly aluminum trihydrate powder) with the wet mix.

The mixing may include preparing a dry mix of the quartz grit, the glass grit, and inorganic pigment color powder, and mixing the quartz powder and the binding resin with the dry mix to produce a wet mix.

The method may include dispersing wet mixture pieces produced from the wet mix of a previously manufactured glass/quartz composite slab in the mold. The wet mix of the previously manufactured glass/quartz composite slab may include pigment.

The method may further comprise mixing a silane coupling agent with the binding resin.

The method may further comprise impact breaking glass from plate glass trim pieces or other glass in a vertical shaft impact (VSI) crusher to produce the glass grit and quartz grit in cube or conical shapes. The method may further comprise crushing window plate glass trim and other glass in a cone crusher prior to the vertical shaft impact crusher to reduce the size of the glass pieces. With the VSI crusher, the glass pieces break on impact with other glass pieces and are not crushed by balls as with the ball mill grinder. This method reduces the internal cracks and fissures in the glass that reduces the tensile strength from the glass's strong chemical bonds.

The method may further comprise dispersing decorative chips of glass or of previously manufactured glass/quartz composite slabs on a surface of the mixture in the mold. The decorative chips may be greater than one centimeter at their largest dimension.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
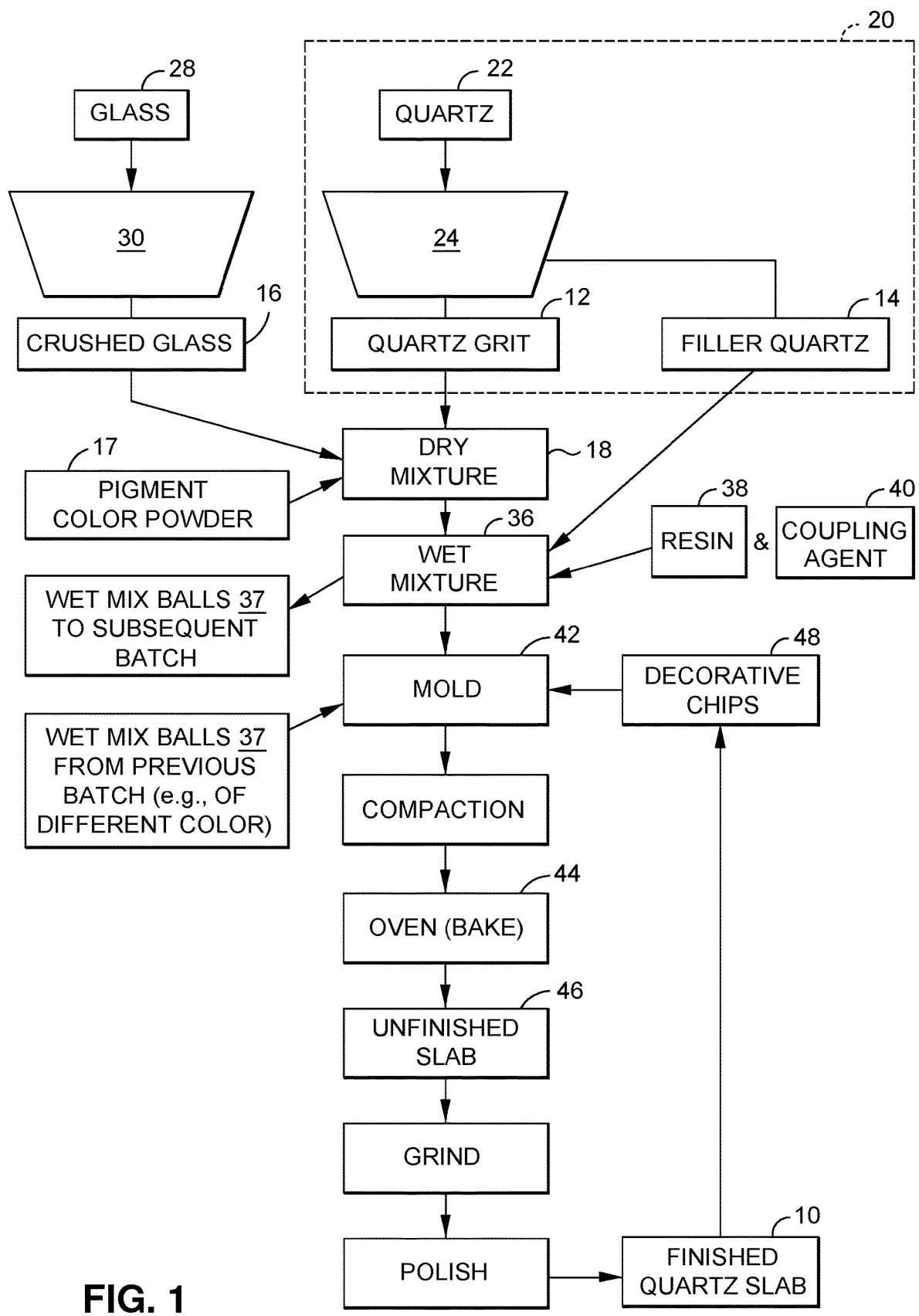
FIG. 1 is a flowchart outlining an exemplary methodology of forming a glass/quartz composite slab.

The detailed description set forth below in connection with the appended drawings is intended as a description of certain embodiments of a glass/quartz composite structure, a slab formed therefrom, and a related method of forming the same and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

The present disclosure generally relates to a method of forming a structure from glass and quartz. The quartz used in the glass/quartz composite structure may be primarily filler where quartz is ground into a powder and becomes part of a composition of resin/filler paste to achieve proper compaction of aggregates. Unit-weight may measure the volume that the graded aggregate quartz and glass and the voids between them will occupy in the resin/filler paste.

The glass grit in combination with the coupling agent absorbs more resin and improves the binding and strength of the structure. The highly compacted mix may contain more glass than quartz, 10-14% resin, and 1.0-2% coupling agent. For example, the glass grit may be in an amount greater than any other single material by weight of the composite structure (e.g. a combined weight of the quartz grit, quartz powder, glass grit, resin, and coupling agent), the coupling agent may be in an amount of 1.0-2% by weight of the composite structure, and the binding resin may be in an amount of 10-14% by weight of the composite structure. In the process, the resin/filler paste tends to bond more effectively with rough-surfaced aggregates. In this case, glass and quartz provide more area to which the filler/resin paste can bond. Furthermore, by incorporating glass grit, which has the property of having more micro-porosity, desired aesthetic attributes may be achieved while increasing the strength of the glass/quartz composite structure as needed for thin format slabs for use in countertops. The thinner format structures in combination with more translucent glass raw materials enable aesthetic and design advantages of premium natural quartzites that add to the value of the countertop designs. Moreover, glass grit with properties which add to the countertop flex and impact strength and translucency and can be found locally may reduce the cost for raw materials with premium quartz designs and enable thinner structures which consume less raw materials.

Previous examples of various aspects of such a process were shown in Applicant's provisional patent application number 62/692,215, the entirety of which is incorporated herein by reference as noted above. In that application, various examples were given as to the size of the quartz and glass grit which could be used to form the glass/quartz composite structure. This disclosure provides further examples of such possible combinations and further discloses aspects of the resultant structures.

Referring to FIG. 1, the process of forming the glass/quartz composite structure may generally include mixing quartz grit 12 (output of quartz processing 24), glass grit 16 (output of glass processing 30) and inorganic pigment powder 17 to form a dry mixture 18. The total amount of glass grit 16 is preferably more than 50 percent by weight of the quartz/glass aggregate which includes the quartz grit 12 and filler quartz powder 14. The total amount of quartz 20 may be minimized without compromising aesthetic or structural characteristics if the packing density is maintained through the use of conical and cubic shaped glass grit 12 within the range of 100 microns to 1200 microns (16 mesh to 120 mesh) and filler quartz powder 14. An exemplary standard which applies to quartz surfaces and which may be met by the glass/quartz composite structures made by the methodology described herein may include the IAPMO IGC 340-2017 standard.

With regard to obtaining desired sizes of the filler quartz 14, a desired high purity filler quartz 14 will have a median particle size D50 between 13 to 14 microns and over 95% will pass through a sieve size 325 mesh (45 microns). The filler quartz 14 may be integrated in the wet mixing process step 36. Completely inert and pH neutral, the filler quartz 14 will not alter or initiate when incorporated with the wet mix (e.g. containing a polyester resin 38). The filler quartz 14, having low surface area and hardness, may offer minimal absorption for high loading and stiffening for thermoset high-performance polyester resin systems.

In one exemplary process, the quartz grit 12, an inorganic or organic pigment color powder 17, and glass grit 16 are added to produce the dry mixture 18 before the step of producing the wet mixture 36, where the resin 38 & coupling agent 40 are then mixed with the quartz grit and glass grit 16. As a final step of the wet mixture 36 process, the filler quartz 14 may then be added and mixed perfectly until the wet mixture reaches a complete homogeneity of wetness as is desirable for the mold process 42. The filler quartz 14 may form 30-35% by weight of the composite structure.

As noted above, the dry mixture 18 may be formed by mixing the glass grit 16, the quartz grit 12, and inorganic or organic pigment color powder 17 to form the desired dry mixture 18 before the step of preparing the wet mixture 36. The wet mixture 36 may be formed by adding the aforementioned resin 38, along with a coupling agent 40, to the dry mixture 18. The resin 38 used in forming the quartz slab 10 may be polyester orthophthalic unsaturated resin, although other resins known in the art may also be used without departing from the spirit and scope of the present disclosure.

The coupling agent 40 may be a silane coupling agent and may be 1.0-2 percent by weight of the composite structure. The coupling agent 40 binds the inorganic materials ((filler quartz 14, quartz grit 12, glass grit 16 and organic matter (resin 38)) and increases the flexural and impact strength of the quartz slab 10 or other end product. An exemplary silane coupling agent is XIAMETER®OFS-6030 silane, which may be used to improve adhesive of free radical cured resins, although other coupling agents 40 known in the art may also be used without departing from the spirit and scope of the present disclosure.

After pouring the wet mixture 36 in a mold 42 having a cavity in the size and shape corresponding to a rough out of the final quartz/glass blend slab 10 or other product, the wet mixture 36 may be compacted and vibrated under vacuum in the mold 42 to remove air from the wet mixture 36. Aggregates have low internal friction and move closer together within the layer under less compaction energy. This is one of the features to obtain excellent physical properties as described below. Alternatively, or in addition, the structure may be placed in an oven 44 at 85-90 degrees C. to initiate the polymerization of the resin/filler paste in order for the quartz/glass blend slab 10 to reach optimum physical properties. The end product of the above steps is an unfinished slab 46, which can then be calibrated (e.g. ground) and polished to produce the finished quartz/glass blend slab 10.

As noted above, specific natural mineral components (e.g. quartz, feldspar, bauxite, etc.) may be added in order to provide the aesthetics of specific natural stones. Such mineral components may be added to the wet mixture 36 for example, either before or after the wet mixture 36 is placed in the mold 42. It is also contemplated that such mineral components may be added to the dry mixture 18. The natural mineral components, which may include the quartz grit 12 and filler quartz powder 14, may be greater than 30% by weight of the composite structure, and the resulting finished quartz slab 10 may constitute agglomerated stone for purposes of U.S. Customs and Border Protection classification.

In order to produce decorative veins and other aesthetic features in the finished quartz slab 10, pieces of previously manufactured finished quartz slabs 10 may be fed back into the manufacturing process as decorative chips 48. For example, unused pieces derived from scraps and/or discarded slabs 10 may be crushed and formed into decorative chips 48 that may be about 1 centimeter or greater in length (e.g. 1.0-2.0 cm). With the wet mixture 36 having been poured in the mold 42, the decorative chips 48 may then be dispersed (e.g. by hand) on the surface of the wet mixture 36 to form veins or other arrangements of the decorative chips 48. The dispersing the decorative chips 48, the wet mixture 36 may be compacted and vibrated under vacuum in the mold 42 to remove air from the wet mixture 36 and/or the structure may be placed in an oven 44 as described above. The resulting unfinished slab 46 may then be calibrated (e.g. ground) and polished to produce the finished quartz/glass blend slab 10 with the arrangement of decorative chips 48 on the surface thereof. In this way, the decorative chips 48 may be used to simulate the appearance of calcite crystals and other mineral deposits in natural stone in the finished quartz slab 10.

Instead of or in addition to the decorative chips 48 being derived from previously finished quartz slabs 10, the decorative chips 48 may be glass chips derived from product glass 28. By dispersing decorative chips 48 of glass that are greater than one centimeter (e.g. 1.0-2.0 cm) at their largest dimension on the surface of the wet mixture 36 while it is in the mold 42, the finished quartz slab 10 may be made in a way that results in a categorization as a crushed glass surface product for purposes of U.S. Customs and Border Protection. It is noted that such a categorization may also require crushed glass content greater than any other single material and visible pieces of crushed glass across the surface. It is contemplated that the finished slabs 10 may have these features as well. For example, a sufficiently large quantity of crushed glass 16 that is 0.2 mm or larger and therefore visible may be produced by a 70 mesh screen and added to the dry mixture 18 as described above.

Alternatively, or in addition, wet mixture pieces (e.g. balls) may be produced from the majority glass wet mix 36, including pigment additives 17, to be used to decorate subsequently produced wet mixtures 36 in the mold 42. For example, as shown in FIG. 1, wet mixture balls 37 may be removed from the wet mixture 36 and thereafter incorporated into the wet mixture 36 of a batch having different color or other properties.

The decorative chips 48 and/or wet mixture pieces 37 (e.g. greater than 1 cm in width) may be used to expand the design flexibility for providing the aesthetics of natural stones. Decorative chips 48 produced from slab pieces may be placed in the slab veins to simulate calcite crystals in white marble designs. In some cases, the slab veins may be produced by a stamp or roller prior to placing the decorative chips 48. Glass chips of greater than 1 cm in width crushed from glass trim may be used to simulate quartz crystals in large grain designs. Majority glass wet mixture pieces 37 (e.g. balls) produced from the wet mixture raw materials and pigment powder may be dispersed on the surface of the wet mixture to provide decorative accent chips in concrete and limestone designs. It is also contemplated that the wet mixture pieces 37 may be placed in the bottom of the mold 42 prior to filling the mold 42 with the wet mixture 36. As the wet mixture 36 is compacted and vibrated in the mold 42, the wet mixture pieces 37 may spread out in the wet mixture 36 without mixing in completely, thus producing the desired localized design elements.

The final quartz/glass blend slab 10 may have a thickness of, for example, 1.2-1.5 cm. Such a thickness may provide a number of properties. For example, a 1.2 cm thick quartz/glass blend slab 10 may have a flex strength greater than 120 MPA (dry) per the ASTM C880 standard. The ASTM C880 test method covers a procedure for determining the flexural strength of stone by use of a simple beam using quarter-point loading. When testing in a dry condition, specimens are placed in an oven for at least 48 hours at 140 degrees Fahrenheit until three successive hourly weight measurements give the same value. Alternatively, specimens can be tested in a wet condition by immersing the specimens in water for 48 hours at room temperature. Upon completion of conditioning, each specimen is placed onto the testing machine and the quarter point loading blocks are brought into contact with the specimen. A load is applied at a constant stress rate of 600 psi/min until failure is observed and the maximum load is recorded.

The 1.2 cm thick quartz/glass blend slab 10 may have an impact resistance of greater than 40 J/m on an ASTM D256 standard Izod impact test. The ASTM D256 test is a pendulum impact test that indicates the energy to break standard test specimens of specified size under stipulated parameters of specimen mounting (using an un-notch sample) and pendulum velocity-at-impact.

The 1.2 cm thick quartz/glass blend slab 10 may have a breaking strength of greater than 1300 lbf in an ASTM C648 test and a 2 cm thick quartz/glass blend slab 10 may have a breaking strength of greater than 4100 lbf. The ASTM C648 test method provides means for establishing whether or not a lot of ceramic tile meets the strength requirements which may appear in tile specifications. Tile strength is the force in pounds-force (or newtons), as read from a pressure gauge, necessary to cause the tile to break. In the ASTM C648 test, the tile is loaded into a three-point support and the load applicator is positioned directly in the center of the tile. Force is applied to the test specimen at a constant rate until the tile breaks into two or more pieces.

In addition, the finished quartz/glass blend slab 10 may have various qualitative features. For example, the finished quartz/glass blend slab 10 may be translucent, either through the veining, or through other portions of the slab. The translucency allows for at least some portion of light from a light source placed on one side of the quartz/glass blend slab 10 to be visible on the other side. This property may be utilized in installations where lighting is placed under a slab being used as a countertop. The light then shows through to a top of the countertop, where it is visible to a user.

Obtaining good flex and impact strength for the glass/quartz composite structure requires a highly compacted 1.2-1.5 cm slab 10 or other product where the glass grit shapes interlock well with the quartz shapes and are bound together with the resin 38. The silane or other coupling agent 40 helps the resin 38 to link the organic material with the inorganic material. Because the glass has more micro-porosity than quartz aggregates, it allows some absorption of the resin/filler paste into the glass. In the recipe preparation, unit-weight preferably measures the volume that the graded aggregate quartz and glass and the voids between them will occupy in the resin/filler paste. A technique of void volume calculation may be used to perfectly balance the % volume of aggregates and % volume of resin/filler paste used. The impact crushing of the glass to produce the desired cubic and/or conical shapes is highly important in forming the tight interlock achieved with the compacting press. In the process, the resin/filler paste tends to bond more effectively with rough-surfaced aggregates such as glass, and rough-surfaced particles provide more area to which the filler/resin paste can bond. The vibration during compaction allows for the resin/filler paste to migrate throughout the structure. The polymerization of the resin after compaction binds the shapes and forms an interlocked structure which is then polished into a finished slab 10 for use in countertops.

Glass impacting and crushing to form the desired shapes for the tight interlocking of the structure may achieve the necessary flex and impact strength for 1.2-1.5 cm structures to be used for countertops and achieve the weight and cost advantages from the use of less raw materials. High purity glass grit allows to obtain very translucent composite slabs with better flex and impact strength than other translucent product available in the market such as natural onyx.

Preferably, the aggregates have a certain level of rough surface, also called micro-porosity of surface, which may be measured and controlled by the execution of Brunauer-Emmett-Teller (BET) Surface Area Analysis and Barrett-Joyner-Halenda (BJH) Pore Size and Volume Analysis.

Setting the correct voids volume ratio of the filler/resin paste may be executed using the test method ASTM C29/C29M-09 Standard Test Method for Bulk Density (Unit Weight) and Voids in Aggregate.

Technical data of a finished quartz/glass blend slab 10 made in accordance with the methodology described herein is shown in the table below.

| CHARACTERISTICS | TEST METHOD | UNIT OF MEASUREMENT | AVERAGE RANGE OF VALUES |
| --- | --- | --- | --- |
| Density | ASTM C97 | $g/cm^3$ | 2.3-2.4 |
| Flexural Strength (Modules Rupture) | ASTM C880 | MPa | 100-140 (Dry) 120-156 (Wet) |
| Water Absorption | ASTM C97 | % | 0.03 |
| Compressive Strength | ASTM C170 | MPa | 143-150 (Dry) 126-146 (Wet) |
| Coefficient of Thermal Expansion | ASTM C531 | Inch/° F. | $2.3 \times 10^{-5}$ |
| Barcol Hardness | ASTM D2583 | Index (0-100) | 87 |
| Abrasion Resistance | ASTM C501 | Wear Index | 95 Minimum |
| Gloss | Gloss Meter | % Incident light reflected at 60° | 45% Minimum |
| Breaking Strength | ASTM C648 | lbf | 4160 |
| Impact Resistance | ASTM D256 | J/M | 40-61 |
| Stain Resistance | ANSI Z124 | Pass/Fail | Pass |
| Wear & Cleanability | ANSI Z124 | Pass/Fail | Pass |
| Boiling Water Resistance | NEMA LD 3-3.5 | | No Effect |
| Color Fastness | ANSI Z124 | Pass/Fail | Pass |
| Moderate Chemical Resistance | ANSI Z124 | Pass/Fail | Pass |

Figure 2:
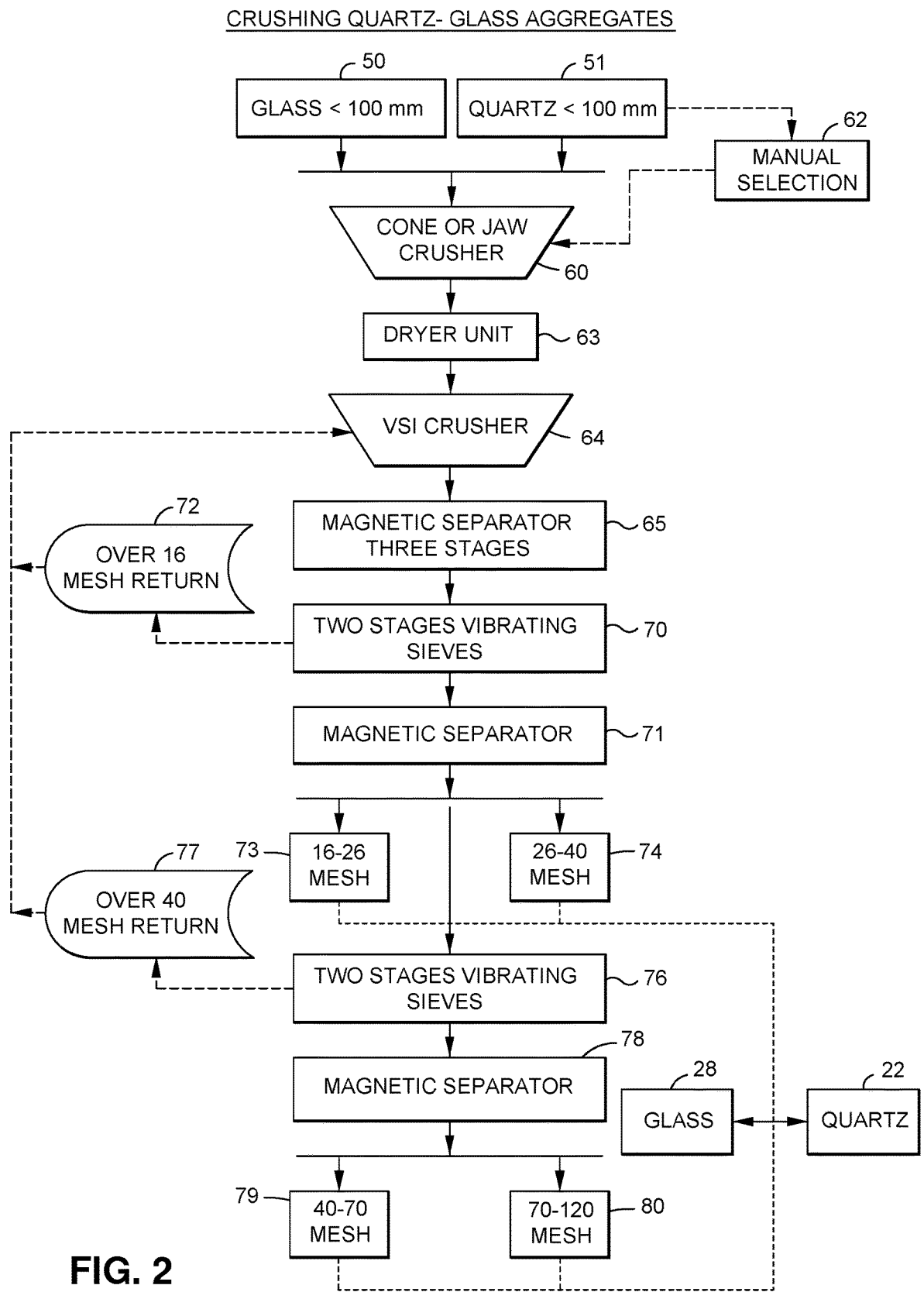
FIG. 2 is a flowchart outlining an exemplary methodology of crushing quartz or glass aggregates.

Aspects of the present disclosure which address the formation of the desired grit sizes and shapes from the vertical shaft impactor will be discussed in more detail below with reference to FIG. 2.

In order to obtain quartz and glass aggregates having the desired shape, e.g. cubic, angular, or round shapes, a two-phase crushing process may be used involving two different types of crushers. As a first step, once the glass 50 or quartz 51 aggregates are transformed to a particle size <4 inches (<100 mm), the glass 50 or quartz 51 aggregates are introduced into a cone or jaw crusher 60 in order to transform the glass 50 or quartz 51 aggregates to a particle size <50 mm. In the case of quartz aggregates 51, a preliminary control step of manual selection 62 of the quartz may be executed to remove quartz impurities and contamination prior to transferring the quartz to the cone or jaw crusher 60. After crushing the glass 50 or quartz 51 aggregates in the cone or jaw crusher 60, the resulting particle size glass 50 or quartz 51 aggregates are transferred to a dryer unit 63 before being introduced into a VSI (Vertical Shaft Impact) crusher 64 for a second crushing step.

The VSI crusher 64 can provide cube shaped aggregate with less dust than a ball mill crusher. The VSI crusher 64 provides for the particles to impact themselves and produces cube shaped particles with less internal cracks and fissures and with less waste than the ball mill crusher. The ball mill crusher produces spherical and round particles but generates more dust and the potential for cracks and fissures in the glass grit which may reduce the tensile strength of the glass grit. The air circulation within the VSI crusher 64 maintains a low level of fine dust produced, which may be less than 20% of the smallest sieved fraction for each particle size of glass 50 or quartz 51 aggregate. The VSI crusher 64 may then feed the desired particle size glass 50 or quartz 51 aggregates to a first magnetic separator stage 65 (of 3 magnetic separator stages 65, 71, 78) in order to remove any iron contaminants before the first 70 of two vibrating sieve stages 70, 76.

The first sieve stage 70 of the two vibrating sieve stages 70, 76 may produce particle size glass 50 or quartz 51 aggregates of 16-26 mesh 73 and 26-40 mesh 74. All the particle size glass 50 or quartz 51 aggregates larger than 16 mesh may recirculate 72 back to the VSI crusher 64 to repeat the second crushing step. The particle size glass 50 or quartz 51 aggregates that are not larger than 16 mesh may pass through the second magnetic separator stage 71 to eliminate any iron contaminants, and the particle size glass 50 or quartz 51 aggregates that are not smaller than 40 mesh may then be bagged in porous bags (e.g. superbags) according to their size (e.g. 16-26 mesh and 26-40 mesh), thus producing the product glass 28 or quartz 22 for use in the method of FIG. 1.

Meanwhile, the second sieve stage 76 of the two vibrating sieve stages 70, 76 may produce particle size glass 50 or quartz 51 aggregates of 40-70 mesh 79 and 70-120 mesh 80. At this stage, all the particle size glass 50 or quartz 51 aggregates larger than 40 mesh may recirculate 77 back to the VSI crusher 64 to repeat the second crushing step. The particle size glass 50 or quartz 51 aggregates that are not over 40 mesh may pass through the third and final magnetic separator stage 78 to make a final screen to eliminate any iron contaminants before being bagged in a porous bag (e.g. superbags) according to their size (e.g. 40-70 mesh and 70-120 mesh), thus producing the product glass 28 or quartz 22 for use in the method of FIG. 1.

Using the grit size and shapes of the glass aggregate in combination with quartz powder to produce the desired aesthetic will be described in more detail below.

The glass grit aggregate size in the range of 16-26 mesh, 26-40 mesh, 40-70 mesh and 70-120 mesh can be used to produce the desired aesthetic from a large grain design, medium grain, small grain and fine grain designs. The following are 2 examples of aggregate compositions used to produce desired grit (grain) sizes and aesthetics:
Large Grain: 8-16 mesh quartz (10%); 16-26 mesh glass (10%); 26-40 mesh glass (12%); 40-70 mesh glass (10.5%); 70-120 mesh glass (14%); 325 mesh quartz powder (30%); resin (10%); coupling and other agents (2%); 0.5-1.0% majority glass chips and/or pieces 4-8 mesh (some 1.0 cm wide)
Small Grain (pure white): 40-70 mesh glass (30%); 70-120 mesh glass (21%); 325 mesh quartz powder (32%); resin: (12.5%); coupling agents & pigments (2%); 2% aluminum trioxide powder; 0.25-0.5% majority glass chips and/or pieces 1.0-1.5 cm wide.

The recipe preparation considers unit-weight measures the volume that graded aggregate quartz, glass and the voids between them will occupy in resin/filler. The technique of Void Volume calculation may be used to perfectly balance the % volume of aggregates and % volume of resin/filler used while obtaining the desired aesthetic.

Having the desired shape of aggregate, the optimum packing using the Void Volume technique, and resin & coupling agents for binding allows for a highly compacted glass/quartz composite structure that provides superior strength in a finished surface.

The above description is given by way of example, and not limitation. Given the above disclosure, one skilled in the art could devise variations that are within the scope and spirit of the invention disclosed herein, including various ways of creating the dry mix. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of manufacturing a glass/quartz composite slab, the method comprising:
    mixing quartz grit, quartz powder, glass grit, and a binding resin, the glass grit being in an amount greater than any other single material by weight of the composite slab, the mixing including preparing a dry mix of the quartz grit and the glass grit, mixing the binding resin with the dry mix to produce a wet mix, and mixing the quartz powder with the wet mix;
    pouring the mixture in a mold;
    compacting the mixture in the mold for 250-320 seconds; and
    dispersing wet mixture pieces produced from the wet mix of a previously manufactured glass/quartz composite slab in the mold.

2. The method of claim 1, wherein the wet mix of the previously manufactured glass/quartz composite slab includes pigment.

3. The method of claim 1, further comprising mixing a silane coupling agent with the binding resin.

4. The method of claim 1, further comprising impact breaking glass aggregate in a vertical shaft impact crusher to produce the glass grit.

5. The method of claim 4, further comprising crushing the glass in a cone crusher prior to said impact breaking the glass in the vertical shaft impact crusher.

6. The method of claim 1, further comprising dispersing decorative chips of previously manufactured glass/quartz composite slabs on a surface of the mixture in the mold.

7. The method of claim 1, further comprising dispersing decorative chips of glass greater than one centimeter at their largest dimension on a surface of the mixture in the mold.

8. A method of manufacturing a glass/quartz composite slab, the method comprising:
    mixing quartz grit, quartz powder, glass grit, and a binding resin, the glass grit being in an amount greater than any other single material by weight of the composite slab, the mixing including preparing a dry mix of the quartz grit and the glass grit, mixing the binding resin with the dry mix to produce a wet mix, and mixing the quartz powder with the wet mix;
    pouring the mixture in a mold;
    compacting the mixture in the mold; and
    dispersing wet mixture pieces produced from the wet mix of a previously manufactured glass/quartz composite slab in the mold.

\* \* \* \* \*